United States Patent
Shankland

[15] 3,686,710
[45] Aug. 29, 1972

[54] COLLAPSIBLE DEER DRAG

[72] Inventor: James F. Shankland, R.D. #1, Box 535, Doylestown, Ohio 44230

[22] Filed: Dec. 8, 1970

[21] Appl. No.: 96,011

[52] U.S. Cl..................................16/112, 214/30
[51] Int. Cl. ..............................................A47b 95/02
[58] Field of Search........16/110, 111, 114, 125, 126, 16/127; 294/15, 16, 30, 28, 29, 1; 74/551.3, 551.4, 543; 224/55; 254/134

[56] References Cited

UNITED STATES PATENTS

| 557,035 | 3/1896 | Smith | 74/551.4 |
| 1,432,054 | 10/1922 | Cuff | 16/111 R |
| 2,207,377 | 7/1940 | Hansen | 16/110 R |

Primary Examiner—Bobby R. Gay
Assistant Examiner—Doris L. Troutman
Attorney—Oberlin, Maky, Donnelly & Renner

[57] ABSTRACT

A collapsible deer drag including a center support member having an aperture therein for attachment of a rope thereto and a pair of pull bar handles pivotally connected to opposite sides of the central support member permitting the handles to be collapsed to provide a compact shape for storage and fully extended for grasping by one or two persons during use. When fully extended, the handles desirably abut against the central support member and also abut against each other for increased strength and rigidity.

5 Claims, 3 Drawing Figures

PATENTED AUG 29 1972 3,686,710
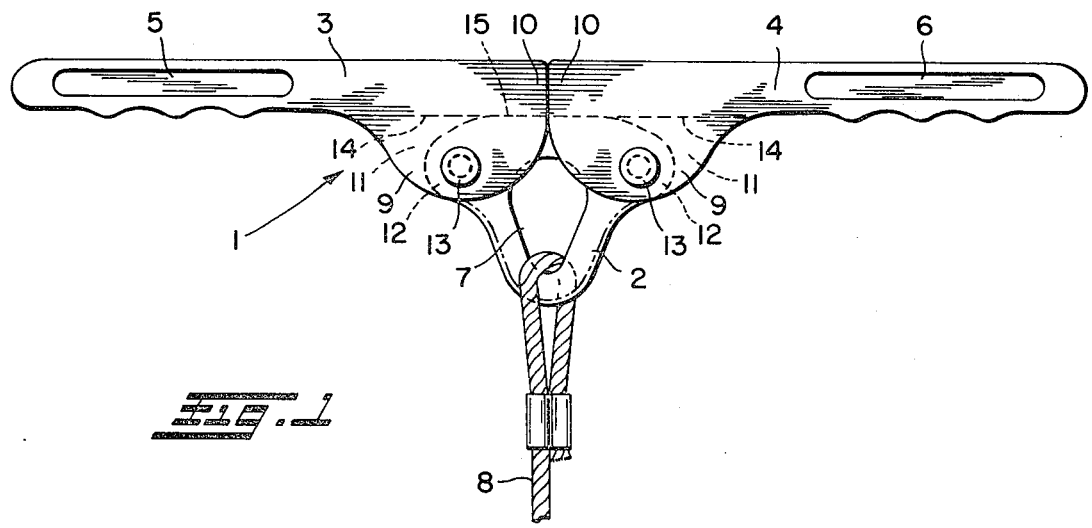
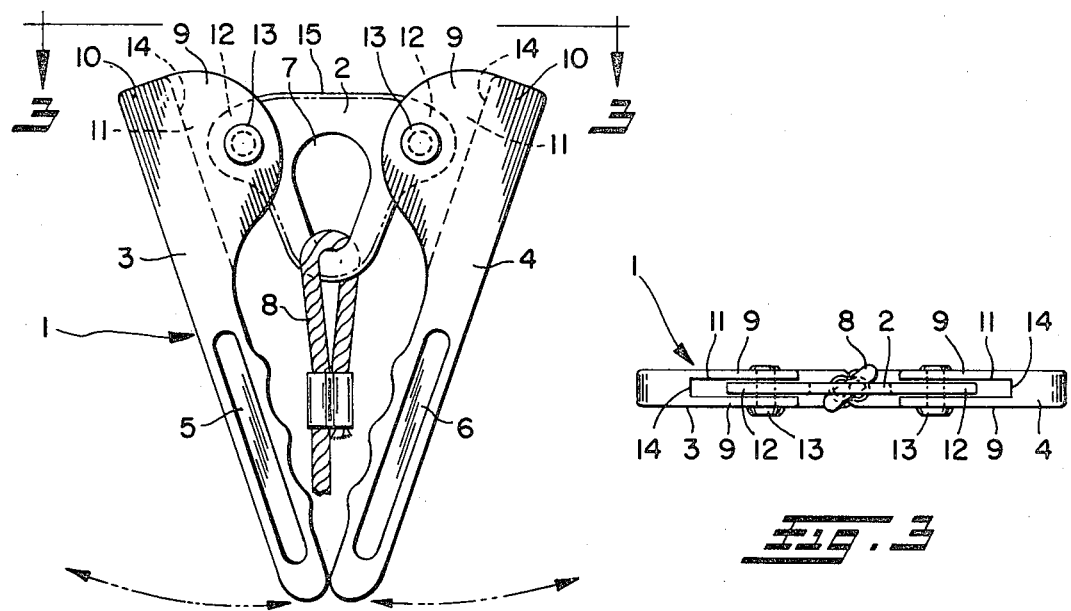
INVENTOR.
JAMES F. SHANKLAND
BY
Oberlin, Maky, Donnelly & Renner
ATTORNEYS

COLLAPSIBLE DEER DRAG

BACKGROUND OF THE INVENTION

This invention relates generally as indicated to a collapsible deer drag for use in dragging slain deer and other animals from one location to another.

Most hunters who have successfully hunted large game such as deer have encountered the sometimes difficult task of dragging the slain animal some distance to an area accessible by car for loading onto the car and transporting the same to another location. Usually, the hunter winds up fashioning a handle from a stick or tree branch and attaching a rope to the branch for use in pulling the animal behind him. However, this requires that the hunter take the time and trouble to locate a suitable stick or branch, which isn't always possible, and afterwards the stick is usually immediately discarded because of its relatively large size and length which makes it difficult to store and carry around.

Various types of shoulder harnesses and the like have been devised for use in dragging slain animals, but they tend to cut into the shoulders of the person dragging the animal and also restrict his freedom of movement. Moreover, such shoulder harnesses are a nuisance to put on and take off especially when two or more persons are taking turns dragging the animal, and such shoulder harnesses do not readily lend themselves to pulling the animal by more than one person at the same time.

SUMMARY OF THE INVENTION

With the foregoing in mind, it is a principal object of this invention to provide a device for dragging slain deer and other animals which is more compact and lightweight to facilitate packing and storage and may readily be grasped by one or two persons to make the task more easy.

Another object is to provide such a device which has foldable handles to permit collapsing of the handles for storage of the device in the pocket of a conventional hunting jacket or other confined place.

Still another object is to provide such a device which is quite strong in relation to its weight, and consists of relatively few parts for ease of manufacture.

Briefly, the device consists of a central support member having a pair of pull bar handles pivotally connected to opposite sides permitting the handles to be collapsed when carried for ease of storage and extended in use to facilitate grasping by one or two persons. When the handles are fully extended, they abut against the central support member and also abut against each other for increased strength and rigidity. Within the central support member there is a large opening for attachment of a rope to the device and reducing the weight thereof. The device may also be made lighter by making the various parts out of a lightweight metal such as aluminum which may be cast to the desired shape, and by minimizing the amount of metal used to make each part.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

BRIEF DESCRIPTION OF THE DRAWINGS

In the annexed drawings:

FIG. 1 is a side elevation view of a preferred form of collapsible deer drag made in accordance with this invention showing the pull bar handles in the fully extended position for grasping by one or two persons;

FIG. 2 is also a side elevation view of the device of FIG. 1 but showing the pull bar handles fully collapsed to provide a compact unit for insertion into the pocket of a conventional hunting jacket or other confined space; and FIG. 3 is an end elevation view of the device of FIG. 2 as seen from the plane of the line 3—3 thereof.

DESCRIPTION OF THE PREFERRED EMBODIMENT

Referring now in detail to the drawings, there is illustrated by way of example a preferred form of deer drag 1 which generally comprises three main parts, a central support member 2 and a pair of pull bar handles 3 and 4 pivotally attached to the central support member 2 on opposite sides thereof. Preferably, the central support member 2 and pull bar handles 3 and 4 are made of a lightweight metal such as aluminum which has a relatively high strength to weight ratio and may be cast into the final desired shape to reduce manufacturing costs. The handles 3 and 4 may be recessed at 5 and 6 to reduce the weight of the device, and the central support member 2 is in the form of a flat plate having a large opening 7 therein to still further reduce the weight of the device and facilitate attachment of a rope 8 to the device by passing the end of the rope through the opening as shown.

To facilitate attachment of the pull bar handles 3 and 4 to the central support member 2, the pull bar handles 3 and 4 are desirably provided with a pair of outwardly projecting ears 9 adjacent their inner ends 10 which define slots 11 therebetween, and the central support member 2 has tabs or projections 12 on such opposite sides thereof which are received in the slots 11 on the handles 3 and 4 and secured in place as by passing rivet pins 13 through aligned openings in the ears 9 and tabs 12.

With the handles 3 and 4 fully extended into alignment with each other as shown in FIG. 1, the bottoms 14 of the slots 11 abut against one edge 15 of the central support member 2 inwardly of the rivets 13 acting as a stop for supporting the handles in the extended position, and the inner ends 10 of the handles 3 and 4 also abut each other for increased strength and rigidity when used to pull a slain animal or other object with the free end of the rope 8 tied around the neck or other part of the animal. In use one person may readily grasp both handles 3 and 4 behind his back to permit pulling while walking forward, and two or more persons can readily take turns pulling with the device without having to disconnect any straps or the like. Moreover, two persons may pull with the device at the same time by each person grasping one of the handles and walking side by side.

When the device is not being used, the handles 3 and 4 may be pivoted toward each other as shown in FIG. 2 to provide a compact unit of a size which will readily fit in the pocket of a conventional hunting jacket or other confined space for ease of packing and storage.

Although the dimensions of the device may obviously be varied, each handle 3 and 4 is desirably approximately 7 ½ inches long, providing a combined pull bar length of approximately 15 inches from one end to the other when fully extended as shown in FIG. 1, but when the handles are collapsed as shown in FIG. 2, the overall height is approximately equal to one handle length or 7 ½ inches. The overall width of the device 1 with the handles 3 and 4 collapsed is desirably approximately 4 ½ inches, making it an easy fit into the pocket of a standard hunting jacket which is usually approximately 6 to 10 inches wide and 8 to 8 ½ inches deep. While the handles 3 and 4 are collapsed, the rope 8 may be left attached to the center support member 2 or removed as desired. If left attached, the rope 8 may either be wrapped around the handles 3 and 4 or separately coiled up and stuffed into the pocket with the device as desired.

From the foregoing, it will now be apparent that the device of the present invention is of a relatively lightweight, compact design including a pair of handles which may readily be collapsed for ease of storage in the pocket of a hunting jacket or other confined area. When extended the handles are well supported and may be grasped by one or two persons for pulling a heavy object such as a deer.

I, therefore, particularly point out and distinctly claim as my invention:

1. A device for use in dragging animals or other objects comprising a support member, a pair of handles pivotally attached to opposite sides of said support member for pivotal movement between an extended position in which said handles are in alignment with each other and a collapsed position, stop means on said support member for supporting said handles in the extended position with the inner ends of said handles abutting each other for increased strength and rigidity, and means for attaching a rope to said support member for connection to the object to be dragged, said handles having spaced apart ears adjacent the inner ends thereof which define slots therebetween, and said support member having projections on such opposite sides which are received in said slots, said ears and projections having aligned openings therein, and pivot pins extending through said aligned openings for pivoting said handles to said support member, said stop means comprising an edge of said support member which engages the bottom of said slots inwardly of said pivot pins when said handles are fully extended as aforesaid.

2. The device of claim 1 wherein said handles have recesses therein for reduced weight.

3. The device of claim 1 wherein said support member has an enlarged opening therein to facilitate attachment of such rope to said support member and reduce the weight of the device.

4. The device of claim 1 wherein said handles and support member are made of cast aluminum.

5. The device of claim 1 which when collapsed may readily be received in the pocket of a conventional hunting jacket for ease of packing and storage.

* * * * *